United States Patent
Li et al.

(10) Patent No.: US 11,687,080 B2
(45) Date of Patent: Jun. 27, 2023

(54) BLACKLIST-BASED RE-NAVIGATION METHOD AND APPARATUS, AND STORAGE MEDIUM

(71) Applicant: Baidu Online Network Technology (Beijing) Co., Ltd., Beijing (CN)

(72) Inventors: Hongye Li, Beijing (CN); Xiaoxin Fu, Beijing (CN); Zhenguang Zhu, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 227 days.

(21) Appl. No.: 16/786,509

(22) Filed: Feb. 10, 2020

(65) Prior Publication Data

US 2020/0264618 A1 Aug. 20, 2020

(30) Foreign Application Priority Data

Feb. 20, 2019 (CN) .......................... 201910127448.2

(51) Int. Cl.
*G05D 1/02* (2020.01)
*G01C 21/34* (2006.01)

(52) U.S. Cl.
CPC ....... *G05D 1/0212* (2013.01); *G01C 21/3415* (2013.01); *G01C 21/3461* (2013.01); *G05D 1/0231* (2013.01); *G05D 1/0257* (2013.01)

(58) Field of Classification Search
CPC ............ G01C 21/3415; G01C 21/3461; G05D 1/0212; G05D 1/0231; G05D 1/0257
See application file for complete search history.

(56) References Cited

U.S. PATENT DOCUMENTS

| 6,362,751 B1* | 3/2002 | Upparapalli ..... G08G 1/096811 340/995.19 |
| 8,543,331 B2* | 9/2013 | Risov ................. G01C 21/3484 701/425 |

(Continued)

FOREIGN PATENT DOCUMENTS

| CN | 101451853 A | 6/2009 |
| CN | 102192750 A | 9/2011 |

(Continued)

OTHER PUBLICATIONS

Notification of Reasons for Refusal issued by the Korean Patent Office in Korean Application No. 10-2020-0019726, dated Mar. 11, 2021 (17 pages).

(Continued)

*Primary Examiner* — Rachid Bendidi
(74) *Attorney, Agent, or Firm* — Benesch, Friedlander, Coplan & Aronoff LLP

(57) ABSTRACT

A blacklist-based re-navigation method and apparatus, and a computer readable storage medium are provided. The blacklist-based re-navigation method includes: detecting whether an obstacle is in a front area of a driverless vehicle in a driving process of the driverless vehicle; if an obstacle is detected in the front area, generating a blacklist associated with the obstacle, wherein the blacklist includes a road on which the obstacle is located; and reporting the blacklist to a navigation system, wherein the navigation system re-plans a navigation route according to the road on which the obstacle is located.

14 Claims, 3 Drawing Sheets

(56) References Cited

U.S. PATENT DOCUMENTS

| | | | | |
|---|---|---|---|---|
| 10,565,873 | B1* | 2/2020 | Christensen | H04W 4/029 |
| 2016/0357262 | A1 | 12/2016 | Ansari | |
| 2017/0192437 | A1* | 7/2017 | Bier | G05D 1/0016 |
| 2017/0242436 | A1* | 8/2017 | Creusot | G08G 1/09623 |
| 2017/0300059 | A1* | 10/2017 | Rust | G01S 7/003 |
| 2018/0004214 | A1* | 1/2018 | Wisniowski | G08G 1/096725 |

FOREIGN PATENT DOCUMENTS

| | | | |
|---|---|---|---|
| CN | 103852772 | A | 6/2014 |
| CN | 104819724 | A | 8/2015 |
| CN | 106767866 | A | 5/2017 |
| CN | 106959696 | A | 7/2017 |
| CN | 206300797 | U | 7/2017 |
| CN | 107389081 | A | 11/2017 |
| CN | 107480638 | A | 12/2017 |
| CN | 108519773 | A | 9/2018 |
| CN | 108628324 | A | 10/2018 |
| CN | 108802761 | A | 11/2018 |
| CN | 108803594 | A | 11/2018 |
| CN | 108803625 | A | 11/2018 |
| CN | 108995646 | A | 12/2018 |
| CN | 109101022 | A | 12/2018 |
| CN | 109358629 | A | 2/2019 |
| JP | 2005-274339 | A | 10/2005 |
| JP | 2008-281523 | A | 11/2008 |
| KR | 10-2013-0045289 | A | 5/2013 |

OTHER PUBLICATIONS

First Office Action from The State Intellectual Property Office of People's Republic of China in Chinese Application No. 201910127448. 2, dated Apr. 20, 2020 (12 pages).
Search Report issued by The State Intellectual Property Office of People's Republic of China in Chinese Application No. 201910127448. 2, dated Apr. 12, 2020 (7 pages).
Zhi, Y., "Overview of Autonomous Obstacle Avoidance and Path Planning For Autonomous Vehicles," Application of Automation, Nov. 3, 2018, pp. 128-129 (English translation of abstract only).
Second Office Action from The State Intellectual Property Office of People's Republic of China in Chinese Application No. 201910127448. 2, dated Oct. 30, 2020 (7 pages).
Supplementary Search Report issued by The State Intellectual Property Office of People's Republic of China in Chinese Application No. 201910127448.2, dated Oct. 22, 2020 (5 pages).
Extended European Search Report issued by the European Patent Office in European Patent Application No. 20157826.7, dated Jul. 14, 2020 (9 pages).
Notice of Reasons for Refusal from Japanese Patent Office in Japanese Patent Application No. 2020-025859, dated Feb. 18, 2021 (8 pages).
Notice of Reasons for Refusal issued by the Japanese Patent Office in Japanese Application No. 2020-025859, dated Nov. 2, 2021 (9 pages).

* cited by examiner

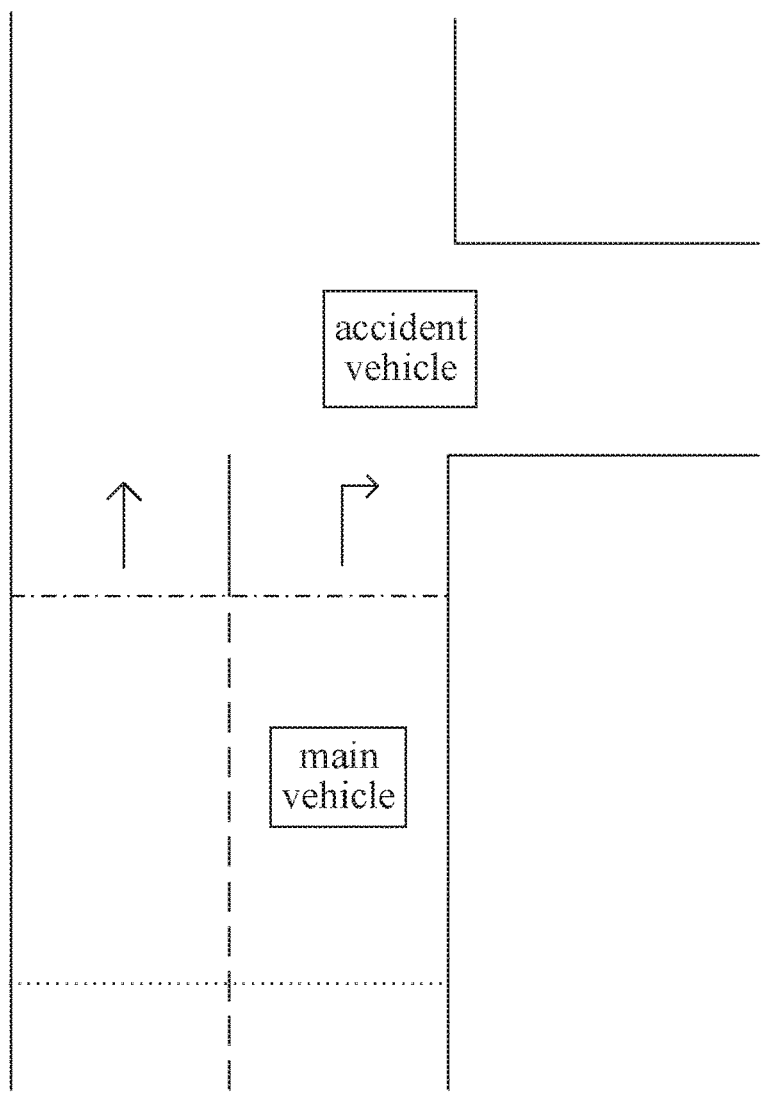

FIG. 2

| if a blockage is found in the front area, detecting whether the blockage is in a stationary state, and determining whether the driverless vehicle is enabled to bypass the blockage | — S210 |

↓

| if it is detected that the blockage is in a stationary state and it is determined that the driverless vehicle is unable to bypass the blockage, determining the blockage as the obstacle | — S220 |

FIG. 3

BLACKLIST-BASED RE-NAVIGATION METHOD AND APPARATUS, AND STORAGE MEDIUM

CROSS-REFERENCE TO RELATED APPLICATION

This application claims priority to Chinese patent application No. 201910127448.2, filed on Feb. 20, 2019, which is hereby incorporated by reference in its entirety.

TECHNICAL FIELD

The application relates to the field of a driverless driving technology, and particularly to a blacklist-based re-navigation method and apparatus, and a computer readable storage medium.

BACKGROUND

In the existing technology, a driverless vehicle system plans a driving route by means of a planning module. If a road in front of a vehicle is found to be blocked when a driverless vehicle travels to a certain position on a current lane in a planned driving route, the driverless vehicle cannot continue driving according to the planned driving route. In this case, the driverless vehicle can only passively wait, and cannot continue to drive until the road congestion is relieved. Lacking of an ability to solve a temporary road congestion makes it impossible for a driverless vehicle in the existing technology to respond flexibly to a road blockage.

SUMMARY

A blacklist-based re-navigation method and apparatus, and a computer readable storage medium are provided according to embodiments of the application, to at least solve the above one or more technical problems in the existing technology.

In a first aspect, a blacklist-based re-navigation method is provided according to an embodiment of the application. The method includes:

detecting whether an obstacle is in a front area of a driverless vehicle in a driving process of the driverless vehicle;

if an obstacle is detected in the front area, generating a blacklist associated with the obstacle, wherein the blacklist includes a road on which the obstacle is located;

reporting the blacklist to a navigation system, wherein the navigation system re-plans a navigation route according to the road on which the obstacle is located.

In an implementation, the detecting whether an obstacle is in a front area of a driverless vehicle in a driving process of the driverless vehicle includes:

detecting whether the obstacle is in the front area by a sensing device provided on the driverless vehicle.

In an implementation, the detecting whether an obstacle is in a front area of a driverless vehicle in a driving process of the driverless vehicle includes:

if a blockage is found in the front area, detecting whether the blockage is in a stationary state, and determining whether the driverless vehicle is enabled to bypass the blockage;

if it is detected that the blockage is in a stationary state and it is determined that the driverless vehicle is unable to bypass the blockage, determining the blockage as the obstacle.

In an implementation, if an obstacle is detected in the front area, generating a blacklist associated with the obstacle includes:

if the obstacle is detected in the front area, determining the road on which the obstacle is located, and generating the blacklist associated with the obstacle at a local area of the road on which the obstacle is located.

In an implementation, the blacklist further includes a lane on which the obstacle is located.

In a second aspect, a blacklist-based re-navigation apparatus is provided according to an embodiment of the application. The apparatus includes:

an obstacle detection unit configured to detect whether an obstacle is in a front area of a driverless vehicle in a driving process of the driverless vehicle;

a blacklist generation unit configured to generate a blacklist associated with an obstacle, if the obstacle is detected in the front area, wherein the blacklist includes a road on which the obstacle is located;

a blacklist report unit configured to report the blacklist to a navigation system, wherein the navigation system re-plans a navigation route according to the road on which the obstacle is located.

In an implementation, the obstacle detection unit is further configured to:

detect whether the obstacle is in the front area by a sensing device provided on the driverless vehicle.

In an implementation, the obstacle detection unit is further configured to:

if a blockage is found in the front area, detect whether the blockage is in a stationary state, and determining whether the driverless vehicle is enabled to bypass the blockage;

if it is detected that the blockage is in a stationary state and it is determined that the driverless vehicle is unable to bypass the blockage, determine the blockage as the obstacle.

In an implementation, the blacklist generation unit is further configured to:

if the obstacle is detected in the front area, determine the road on which the obstacle is located, and generate the blacklist associated with the obstacle at a local area of the road on which the obstacle is located.

In an implementation, the blacklist further includes a lane on which the obstacle is located.

In a third aspect, a blacklist-based re-navigation apparatus is provided according to an embodiment of the application. The functions of the apparatus may be implemented by using hardware or by corresponding software executed by hardware. The hardware or software includes one or more modules corresponding to the functions described above.

In a possible embodiment, the apparatus structurally includes a processor and a memory wherein the memory is configured to store a program which supports the apparatus in executing the above method. The processor is configured to execute the program stored in the memory. The apparatus may further include a communication interface through which the apparatus communicates with other devices or communication networks.

In a fourth aspect, a computer-readable storage medium for storing computer software instructions used for a blacklist-based re-navigation apparatus is provided. The computer-readable storage medium may include programs involved in executing the method described above in the first aspect.

One of the above technical solutions has the following advantages or beneficial effects: if it is found that a road in the front is blocked, a blacklist of the road on which an obstacle is located is reported to a navigation system, the navigation system is triggered to re-plan a navigation route with an aim of avoiding the blocked road section, re-provide a navigation route for a road blockage situation and guide a driverless vehicle to continue driving, thereby making a driverless driving much safer and smoother.

The above summary is provided only for illustration and is not intended to be limiting in any way. In addition to the illustrative aspects, embodiments, and features described above, further aspects, embodiments, and features of the present application will be readily understood from the following detailed description with reference to the accompanying drawings.

BRIEF DESCRIPTION OF THE DRAWINGS

In the drawings, unless otherwise specified, identical or similar parts or elements are denoted by identical reference numerals throughout the drawings. The drawings are not necessarily drawn to scale. It should be understood these drawings merely illustrate some embodiments of the present application and should not be construed as limiting the scope of the present application.

FIG. 2 is a schematic diagram showing a scene of an obstacle detection in a blacklist-based re-navigation method according to an embodiment of the application.

FIG. 3 is a flowchart showing an obstacle detection in a blacklist-based re-navigation method according to an embodiment of the application.

DETAILED DESCRIPTION OF THE EMBODIMENTS

Hereafter, only certain exemplary embodiments are briefly described. As can be appreciated by those skilled in the art, the described embodiments may be modified in different ways, without departing from the spirit or scope of the present application. Accordingly, the drawings and the description should be considered as illustrative in nature instead of being restrictive.

Figure 1:
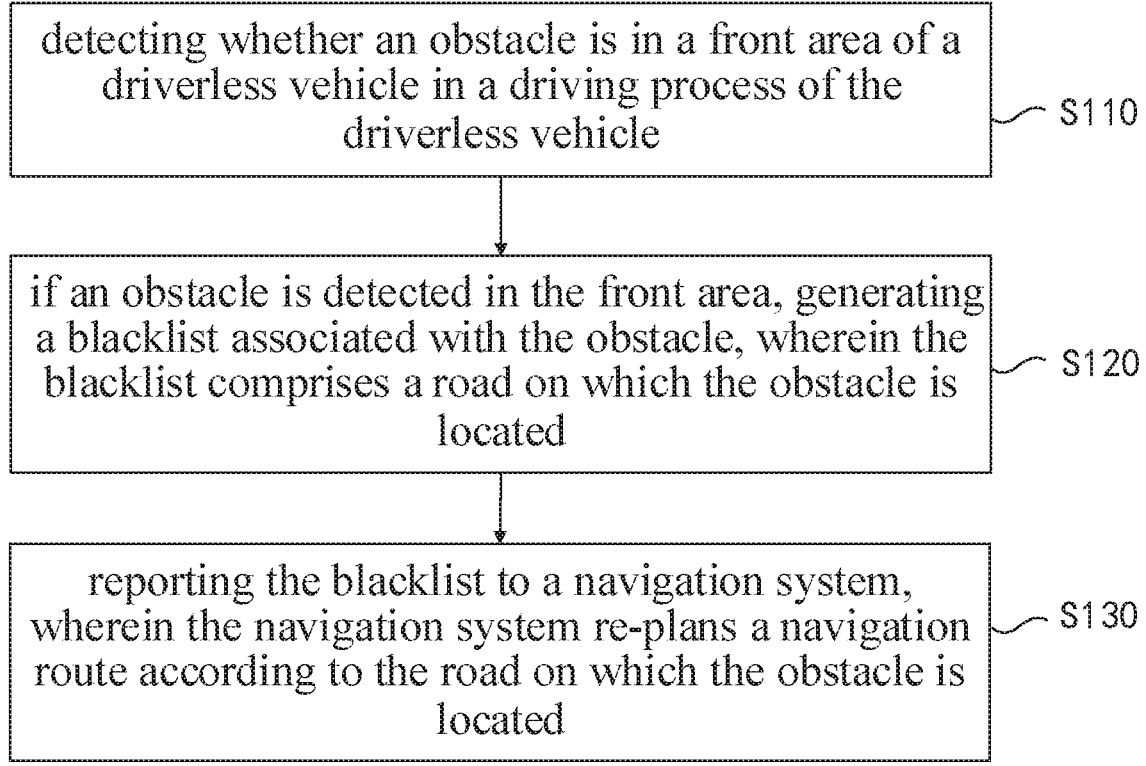
FIG. 1 is a flowchart showing a blacklist-based re-navigation method according to an embodiment of the application.

FIG. 1 is a flowchart showing a blacklist-based re-navigation method according to an embodiment of the application. As illustrated in FIG. 1, a blacklist-based re-navigation method according to an embodiment of the application includes the following steps.

At S110, it is detected whether an obstacle is in a front area of a driverless vehicle in a driving process of the driverless vehicle.

At S120, if an obstacle is detected in the front area, a blacklist associated with the obstacle is generated, wherein the blacklist includes a road on which the obstacle is located.

At 130, the blacklist is reported to a navigation system, wherein the navigation system re-plans a navigation route according to the road on which the obstacle is located Road conditions may change in real time, when a driverless vehicle drives on a road. Generally, in case that a road in front of the driverless vehicle is found to be blocked, the driverless vehicle may have to wait, which means it cannot continue to drive until the road blockage is lifted. In an embodiment of the application, if it is found that a road ahead is blocked, a re-navigation planning of a navigation system of the driverless vehicle may be triggered to re-plan a navigation route with an aim of avoiding the blocked road section, guiding the driverless vehicle to reach a destination successfully by using the re-planned navigation route. The re-navigation planning means re-planning a navigation route. If there is an blockage on the road ahead which is incapable to be bypassed by the driverless vehicle, that is to say, if the driverless vehicle cannot continue driving according to the original navigation route due to an obstacle on the road in the front area of the driverless vehicle, the driverless vehicle may have to perform the re-navigation planning to re-plan a new navigation route.

FIG. 2 is a schematic diagram showing a scene of an obstacle detection in a blacklist-based re-navigation method according to an embodiment of the application. As illustrated in FIG. 2, in an example, a driverless vehicle needs to turn right according to an original navigation route, when arriving at an intersection. However, it is found that an obstacle vehicle which cannot drive due to an accident vehicle is parked at the right-turn intersection, or that some roadblocks are set there, when the driverless vehicle approaches the intersection. The driverless vehicle, which is blocked by an obstacle in the front area, cannot turn right according to the original navigation route, and a new navigation route is required to be re-planned. In this case, the driverless vehicle may report to the navigation system that it cannot turn right due to the current road condition and needs to go straight and may request the navigation system to re-plan a new route which avoids turning right.

In an implementation, the detecting whether an obstacle is in a front area of a driverless vehicle in a driving process of the driverless vehicle at S110 in FIG. 1 includes the following step.

The obstacle in the front area of the driverless vehicle is detected by a sensing device provided on the driverless vehicle.

In the implementation, a sensing device provided on the driverless vehicle, such as a camera, a laser radar, a millimeter wave radar, an ultrasonic radar or the like, may be used to sense the surrounding environment and determine whether the road ahead is blocked.

FIG. 3 is a flowchart showing an obstacle detection in a blacklist-based re-navigation method according to an embodiment of the application. As illustrated in FIG. 3, in an implementation, the detecting whether an obstacle is in a front area of a driverless vehicle in a driving process of the driverless vehicle at S110 in FIG. 1 includes the following steps.

At S210, if a blockage is found in the front area, it is detected whether the blockage is in a stationary state, and determining whether the driverless vehicle is enabled to bypass the blockage.

At S220, if it is detected that the blockage is in a stationary state and it is determined that the driverless vehicle is unable to bypass the blockage, the blockage is determined as the obstacle.

As mentioned above, an obstacle on the road ahead can be detected by a sensing device. The obstacle may include a blockage which is found to be temporarily on the road and prevents the driverless vehicle from passing according to the original navigation route. For example, a roadblock is temporarily set up on the road ahead, causing the driverless vehicle to fail to pass according to the original navigation route. For another example, a traffic accident occurs on the road ahead, and the road is blocked by several accident vehicles, causing the main vehicle to fail to pass according to the original navigation route. In the above two examples, both the roadblock and the accident vehicles can be determined as the obstacles.

In another example, a vehicle temporarily parks on the road ahead and continues to drive shortly afterwards. The vehicle runs normally after its restart and will not obstruct the following main vehicle. In this case, it is inappropriate to determine the vehicle as an obstacle. In another example, there is a blockage with a small volume on the road ahead, such as goods that are accidentally dropped off from a front vehicle when the vehicle is driving. Due to the small volume of the blockage, the main vehicle can bypass the blockage. In this case, it is also inappropriate to determine the blockage as an obstacle, since the blockage will not prevent the main vehicle from passing according to the original navigation route.

Thus, when detecting an obstacle by a driverless vehicle, the following factors should be taken into account: 1) whether a blockage on the road ahead is stationary. That is to say, it should be considered whether the blockage has a tendency to move away and whether the blockage will continue blocking the road ahead. 2) Whether the blockage on the road ahead can be bypassed. For example, when the blockage has a very large volume, it may not be bypassed. In consideration of the above factors, if a blockage which is stationary and is incapable to be bypassed is detected on the road ahead, the blockage can be determined as the obstacle. Once it is determined that there is an obstacle on the road ahead, it can be determined that the road ahead is blocked and impassable.

In an implementation, if an obstacle is detected in the front area, generating a blacklist associated with the obstacle at S120 in FIG. 1 includes the following step.

If the obstacle is detected in the front area, the road, on which the obstacle is located, is determined, and the blacklist associated with the obstacle is generated at a local area of the road on which the obstacle is located.

The blacklist may include temporary road-level blockage information. For instance, in the example illustrated in FIG. 2, the driverless vehicle reports a message that it cannot turn right, to the navigation system by transmitting a blacklist. After detecting an obstacle, the driverless vehicle may map the obstacle into a road through a blacklist generation strategy, and then report the road where the obstacle is located to the navigation system. The information to be received, on which is focused by the navigation system is "which road is blocked", rather than "what the obstacle at a certain position is". The blacklist generation strategy may be determining a road on which the obstacle is located after detecting the obstacle, and then generating the blacklist associated with the obstacle at a local area of the road on which the obstacle is located.

Specifically, at S110 in FIG. 1, during the detecting an obstacle on a road ahead, an obstacle in the front area of the driverless vehicle is detected by a radar or camera provided on the driverless vehicle. Then, the generating a blacklist at S120 may include determining a road on which the detected obstacle in the front is located. The blacklist may refer to a temporary road blockage. For example, during driving, the driverless vehicle dynamically detects a temporary road blockage and then reports it to the navigation system. There is no blacklist in the default information in the navigation system, because a temporary road blockage is likely to be lifted at any time. Thus, when detecting a temporary road blockage, the driverless vehicle is capable to report it to the navigation system by means of a blacklist. At S130, the driverless vehicle reports the blacklist to the navigation system and requests the navigation system to re-plan a new route. After receiving the blacklist including the road on which the obstacle is located, the navigation system re-plans a new navigation route, and transmits the re-planned navigation route back to a driving control system of the driverless vehicle.

To sum up, the function of the blacklist is to trigger a re-navigation plan. The navigation system uses the information of the blacklist to re-plan a new navigation route. In one example, since the blacklist may refer to a temporary road blockage which may be lifted at any time, the blacklist may not be permanently stored in the navigation system, and it is only used to make a responsive re-navigation plan when a road blockage is detected.

In an implementation, the blacklist further includes a lane on which the obstacle is located.

The blacklist may be of a road-level or a lane-level. The blacklist of the road-level includes a road on which an obstacle is located. The blacklist of the lane-level includes a lane on which an obstacle is located.

An overtaking can be realized by means of a blacklist of the lane-level. In an example, a main vehicle detects a "dead vehicle" on the current lane ahead. The "dead vehicle" here refers to a vehicle which is in a stationary state for a long time. Then, the main vehicle generates a blacklist including information about the local area where the main lane is located and reports the blacklist to the navigation system. After receiving the blacklist, the navigation system re-plans a new route, for example, the navigation system re-plans a lane-changed driving route for the blacklist, to bypass the "dead vehicle" blocked ahead.

The above technical solution has the following advantages or beneficial effects: if it is found that a road in the front is blocked, a blacklist of the road on which an obstacle is located is reported to a navigation system, the navigation system is triggered to re-plan a navigation route with an aim of avoiding the blocked road section, re-provide a navigation route for a road blockage situation and guide a driverless vehicle to continue driving, thereby making a driverless driving much safer and smoother.

Figure 4:
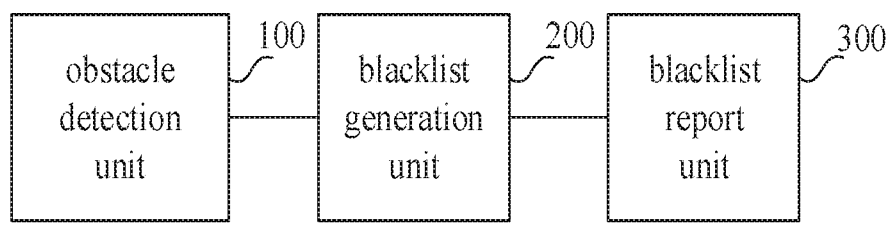
FIG. 4 is a structural block diagram showing a blacklist-based re-navigation apparatus according to an embodiment of the application.

FIG. 4 is a structural block diagram showing a blacklist-based re-navigation apparatus according to an embodiment of the application. As illustrated in FIG. 4, a blacklist-based re-navigation apparatus according to an embodiment of the application includes:

an obstacle detection unit 100 configured to detect whether an obstacle is in a front area of a driverless vehicle in a driving process of the driverless vehicle;

a blacklist generation unit 200 configured to generate a blacklist associated with an obstacle, if the obstacle is detected in the front area, wherein the blacklist includes a road on which the obstacle is located;

a blacklist report unit 300 configured to report the blacklist to a navigation system, wherein the navigation system re-plans a navigation route according to the road on which the obstacle is located.

In an implementation, the obstacle detection unit 100 is further configured to:

detect whether the obstacle is in the front area by a sensing device provided on the driverless vehicle.

In an implementation, the obstacle detection unit 100 is further configured to:

if a blockage is found in the front area, detect whether the blockage is in a stationary state, and determining whether the driverless vehicle is enabled to bypass the blockage;

if it is detected that the blockage is in a stationary state and it is determined that the driverless vehicle is unable to bypass the blockage, determine the blockage as the obstacle.

In an implementation, the blacklist generation unit 200 is further configured to:

if the obstacle is detected in the front area, determine the road on which the obstacle is located, and generate the blacklist associated with the obstacle at a local area of the road on which the obstacle is located.

In an implementation, the blacklist further includes a lane on which the obstacle is located.

In this embodiment, functions of modules in the blacklist-based re-navigation apparatus refer to the corresponding description of the method mentioned above and thus a detailed description thereof is omitted herein.

In a possible embodiment, the blacklist-based re-navigation apparatus structural includes a processor and a memory, wherein the memory is configured to a store program which supports the blacklist-based re-navigation apparatus in executing the above blacklist-based re-navigation method. The processor is configured to execute the program stored in the memory. The blacklist-based re-navigation apparatus may further include a communication interface through which the blacklist-based re-navigation apparatus communicates with other devices or communication networks.

Figure 5:
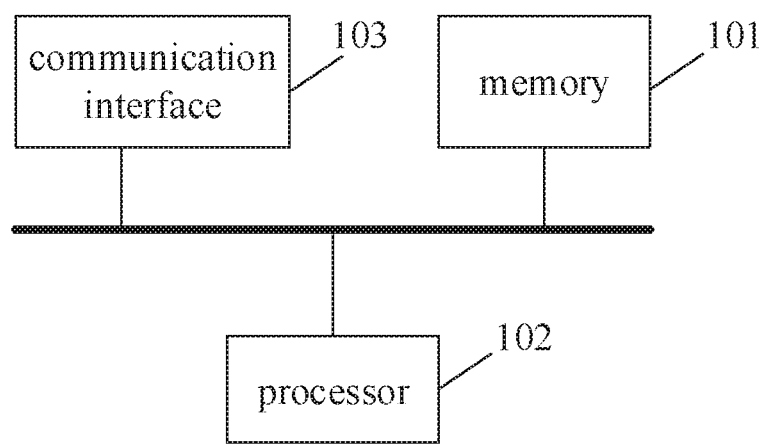
FIG. 5 is a structural block diagram showing a blacklist-based re-navigation apparatus according to an embodiment of the application.

FIG. 5 is a structural block diagram showing a blacklist-based re-navigation apparatus according to an embodiment of the application. As illustrated in FIG. 5, the apparatus includes a memory 101 and a processor 102, wherein a computer program that can run on the processor 102 is stored in the memory 101. The processor 102 executes the computer program to implement the blacklist-based re-navigation method in the above embodiment. The number of either the memory 101 or the processor 102 may be one or more.

The apparatus further includes:

a communication interface 103 configured to communicate with an external device for a data interactive transmission.

The memory 101 may include a high-speed Random Access Memory (RAM) and may also include a non-volatile memory such as at least one magnetic disk memory.

If the memory 101, the processor 102 and the communication interface 103 are implemented independently, the memory 101, the processor 102 and the communication interface 103 may be connected to each other via a bus to realize mutual communication. The bus may be an Industrial Standard Architecture (ISA) bus, a Peripheral Component Interconnect (PCI) bus, an Extended Industry Standard Component (EISA) bus, or the like. The bus may be categorized into an address bus, a data bus, a control bus, and the like. For ease of illustration, only one bold line is shown in FIG. 5 to represent the bus, but it does not necessarily mean that there is only one bus or one type of bus, Optionally, in a specific implementation, if the memory 101, the processor 102 and the communication interface 103 are integrated on one chip, the memory 101, the processor 102 and the communication interface 103 may implement mutual communication through an internal interface.

In yet another aspect, according to an embodiment of the present application, it is provided a computer-readable storage medium having computer programs stored thereon. When executed by a processor, the programs implement the blacklist-based re-navigation method described above.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood various portions of the present application may be implemented by hardware, software, firmware, or a combination thereof In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGAs), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A blacklist-based re-navigation method, applied to a driverless vehicle, comprising:
   detecting, by a sensing device provided on the driverless vehicle, whether an obstacle is in a front area of the driverless vehicle in a driving process of the driverless vehicle;
   if the obstacle is detected in the front area, generating, by the driverless vehicle, a blacklist associated with the obstacle by:
     determining a road on which the obstacle is located;
     mapping the obstacle into the road through a blacklist generation strategy; and
     generating the blacklist associated with the obstacle at a location area of the road, wherein the blacklist comprises the road on which the obstacle is located;
   reporting, by the driverless vehicle, the blacklist to a navigation system, such that, after receiving the blacklist, the navigation system re-plans a navigation route according to the blacklist, and transmits the re-planned navigation route to a driving control system of the driverless vehicle; and
   controlling, by the driving control system of the driverless vehicle, the driverless vehicle to travel in accordance with the re-planned navigation route,
   wherein the blacklist is at least temporarily stored in the navigation system.

2. The method according to claim 1, wherein the detecting whether the obstacle is in the front area of the driverless vehicle in the driving process of the driverless vehicle comprises:
   detecting whether the obstacle is in the front area by a sensing device provided on the driverless vehicle.

3. The method according to claim 2, wherein the blacklist further comprises a lane on which the obstacle is located.

4. The method according to claim 1, wherein the detecting whether the obstacle is in the front area of the driverless vehicle in the driving process of the driverless vehicle comprises:
   if a blockage is found in the front area, detecting whether the blockage is in a stationary state, and determining whether the driverless vehicle is enabled to bypass the blockage; and
   if it is detected that the blockage is in the stationary state and it is determined that the driverless vehicle is unable to bypass the blockage, determining the blockage as the obstacle.

5. The method according to claim 1, wherein the blacklist further comprises a lane on which the obstacle is located.

6. A blacklist-based re-navigation apparatus, applied to a driverless vehicle, comprising:
   one or more processors; and
   a storage device configured to store one or more programs, wherein
   the one or more programs, when executed by the one or more processors, cause the one or more processors to:
   detect, by a sensing device provided on the driverless vehicle, whether an obstacle is in a front area of a driverless vehicle in the driving process of the driverless vehicle;
   generate, by the driverless vehicle, a blacklist associated with the obstacle by mapping the obstacle into a road through a blacklist generation strategy, if the obstacle is detected in the front area, determine the road on which the obstacle is located, and generate the blacklist associated with the obstacle at a local area of the road, wherein the blacklist comprises the road on which the obstacle is located;
   report, by the driverless vehicle, the blacklist to a navigation system, such that, after receiving the blacklist, the navigation system re-plans a navigation route according to the blacklist, and transmits the re-planned navigation route to a driving control system of the driverless vehicle; and
   control, by the driving control system of the driverless vehicle, the driverless vehicle to travel in accordance with the re-planned navigation route,
   wherein the blacklist is at least temporarily stored in the navigation system.

7. The apparatus according to claim 6, wherein the one or more programs, when executed by the one or more processors, cause the one or more processors further to:
   detect whether the obstacle is in the front area by a sensing device provided on the driverless vehicle.

8. The apparatus according to claim 7, wherein the blacklist further comprises a lane on which the obstacle is located.

9. The apparatus according to claim 6, wherein the one or more programs, when executed by the one or more processors, cause the one or more processors further to:
   if a blockage is found in the front area, detect whether the blockage is in a stationary state, and determining whether the driverless vehicle is enabled to bypass the blockage; and
   if it is detected that the blockage is in the stationary state and it is determined that the driverless vehicle is unable to bypass the blockage, determine the blockage as the obstacle.

10. The apparatus according to claim 6, wherein the blacklist further comprises a lane on which the obstacle is located.

11. A non-transitory computer-readable storage medium, applied to a driverless vehicle, comprising computer executable instructions stored thereon, wherein the executable instructions, when executed by a processor, causes the processor to:
- detect, by a sensing device provided on the driverless vehicle, whether an obstacle is in a front area of the driverless vehicle in a driving process of the driverless vehicle;
- if the obstacle is detected in the front area, generate, by the driverless vehicle, a blacklist associated with the obstacle by:
  - determining a road on which the obstacle is located;
  - mapping the obstacle into the road through a blacklist generation strategy; and
  - generating the blacklist associated with the obstacle at a location area of the road, wherein the blacklist comprises the road on which the obstacle is located;
- report, by the driverless vehicle, the blacklist to a navigation system, such that, after receiving the blacklist, the navigation system re-plans a navigation route according to the blacklist, and transmits the re-planned navigation route to a driving control system of the driverless vehicle; and
- control, by the driving control system of the driverless vehicle, the driverless vehicle to travel in accordance with the re-planned navigation route,
- wherein the blacklist is at least temporarily stored in the navigation system.

12. The non-transitory computer-readable storage medium according to claim 11, wherein the executable instructions, when executed by a processor, cause the processor further to:
- detect whether the obstacle is in the front area by a sensing device provided on the driverless vehicle.

13. The non-transitory computer-readable storage medium according to claim 11, wherein the executable instructions, when executed by a processor, cause the processor further to:
- if a blockage is found in the front area, detect whether the blockage is in a stationary state, and determine whether the driverless vehicle is enabled to bypass the blockage; and
- if it is detected that the blockage is in the stationary state and it is determined that the driverless vehicle is unable to bypass the blockage, determine the blockage as the obstacle.

14. The non-transitory computer-readable storage medium according to claim 11, wherein the blacklist further comprises a lane on which the obstacle is located.

* * * * *